March 7, 1967 J. DUMPIS 3,307,888
IDLER ARM REPLACEMENT BEARING

Filed April 22, 1964 2 Sheets-Sheet 1

INVENTOR.
JANIS DUMPIS
BY *Janis Dumpis*

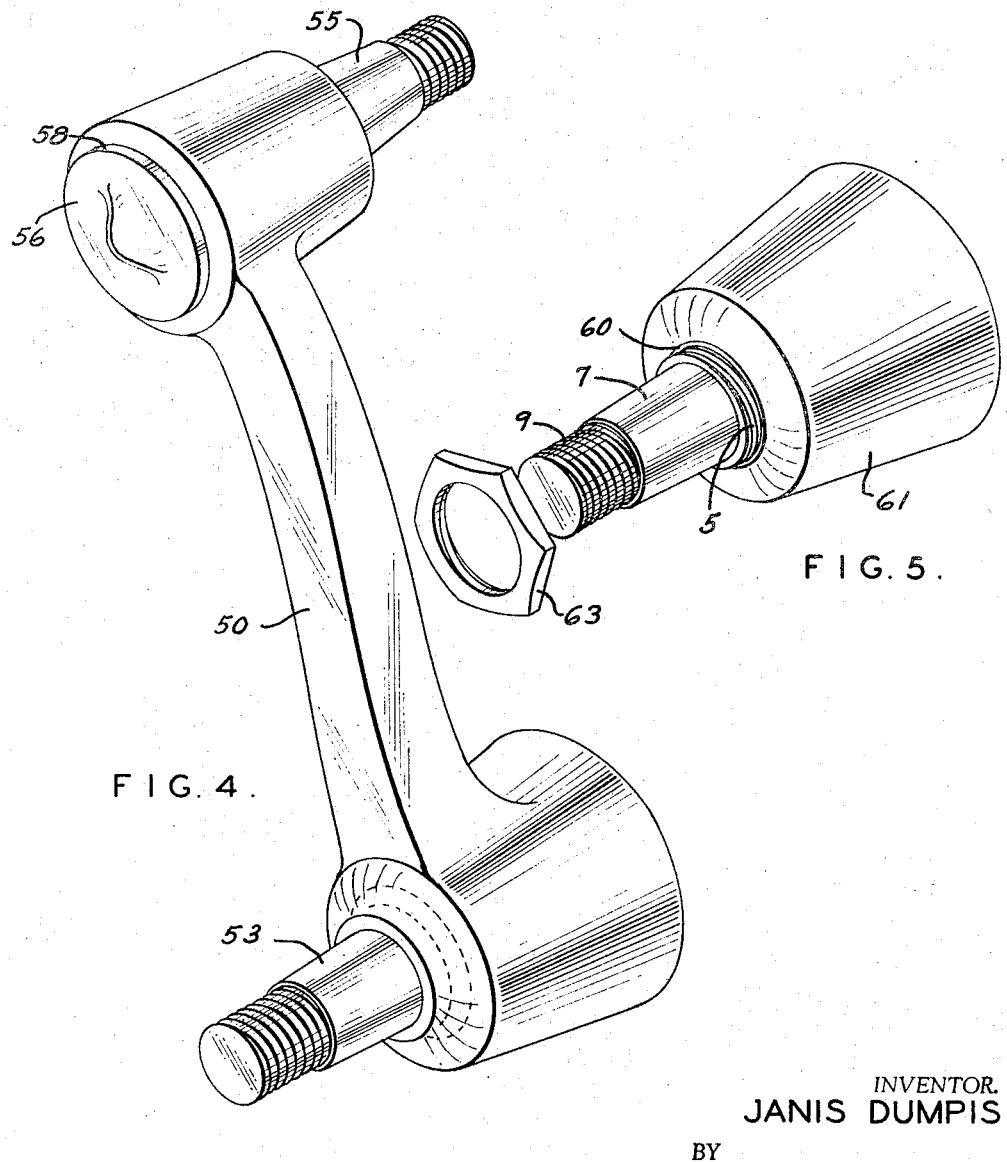

United States Patent Office 3,307,888
Patented Mar. 7, 1967

3,307,888
IDLER ARM REPLACEMENT BEARING
Janis Dumpis, St. Ann, Mo., assignor to Champ-Items, Inc., St. Louis, Mo., a corporation of Missouri
Filed Apr. 22, 1964, Ser. No. 361,647
8 Claims. (Cl. 308—71)

This invention relates to an improvement in replacement bearings primarily for automotive steering and wheel suspension linkages where safety, dependability and smooth uniform performance is vital. More particularly the invention is an improved replacement bearing which has distinct features to obtain these results, and at the same time contribute to characteristics lending adaptability.

The bearings now in use in such automotive practices and including orginal equipment often develop looseness and play for one reason or another within a relatively short period of time measured in actual vehicle miles traveled. Especially is this so when certain unfavorable conditions for operation exist. These bearings used in automotive practices are usually constructed so that replacement means installation of an entire part including the bearings because usually special tools and equipment, not readily available, must be used to actually replace a worn or defective bearing in the original equipment part. If this involves skilled labor, as it does in most cases, then installation of a new bearing in an old part becomes more expensive than substituting the entire replacement part which has the new bearings installed.

The reasons or desirability for replacement are many. Looseness in the bearings of a wheel suspension linkage on a vehicle can lead to many difficulties in steering and vehicle handling characteristics. Wheel alignment can be affected or difficult to correct if improper. Looseness in a single bearing of a suspension or steering linkage, which has many articulated parts, can be a cause for rejection of the vehicle as unsafe.

The instant invention provides a convenient, economical, and reliable installation more durable because of inherent features providing for pre-loading the bearing before or after installation for smoother, more uniform performance.

It is one of the the objects of this invention to provide an improved form of bearing for the uses specified which is safe, reliable, and more durable to retain smooth operation.

According to this invention, this replacement bearing includes a tubular housing dimensioned externally to have a driving fit, or press fit, in the eye of a steering or suspension link. This housing has a threaded neck which projects through the eye to which a locking nut may be applied securing the housing in the eye after their assembly. Rotatable in the housing is a spindle with a projecting end adapted for connection with the eye of a connecting bracket or connecting link forming a part of the same linkage train. This spindle is journaled in the housing by a combined radial and thrust bearing unit and a separate thrust bearing unit so arranged and constructed that when the spindle is moved in one direction, by one adjustment provided therein, both bearing units are pre-loaded to eliminate any looseness either radially or axially, not only in both bearing units, but also any looseness between bearing units and their housing.

It is another object of this invention to provide a bearing mounting for a spindle within a housing which is so constructed and arranged that a single adjustment can pre-load the parts of the bearing on the spindle and the parts of the bearing against the housing.

Other objects and advantages of this invention will appear from the following detailed description which is in such clear, concise, and exact terms as will enable anyone skilled in the art to make and use the same when taken in conjunction with the accompanying drawings, forming a part thereof, and in which:

FIG. 4 is a perspective view of a typical form of idler arm used as original equipment in automotive practices and showing in phantom the general outline of one eye;

FIG. 5 is a perspective view on an enlarged scale illustrating the manner of installation of the replacement bearing within an eye of the idler arm link.

Figure 1:
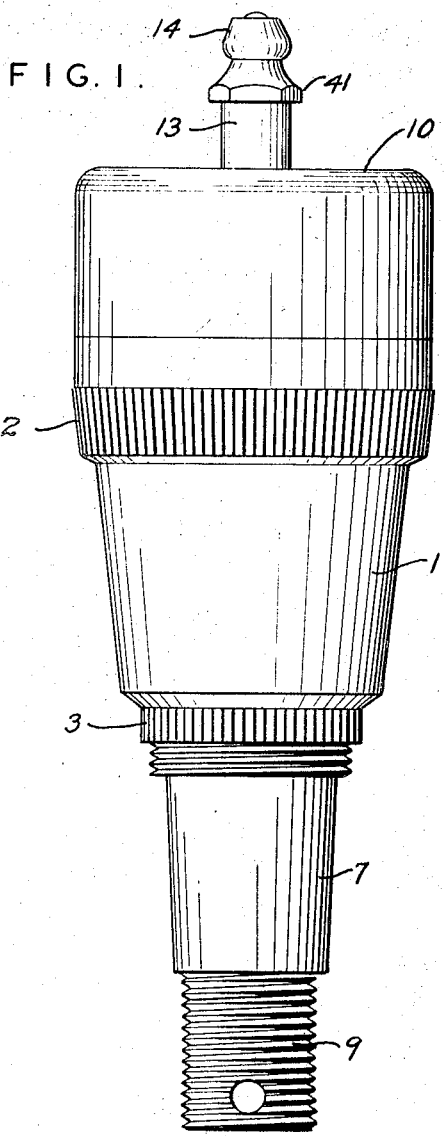
FIG. 1 is a side elevational view of a replacement bearing constructed in accordance with the teachings of this invention.
Figure 2:
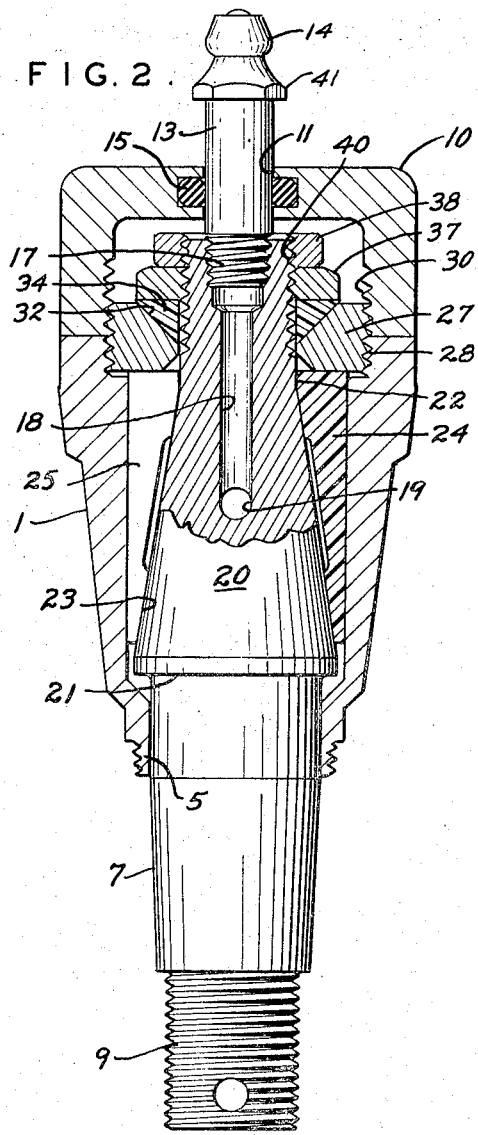
FIG. 2 is a view illustrating the replacement bearing shown in FIG. 1 in transverse vertical section.

One embodiment of the instant invention is illustrated in FIGS. 1 and 2. With particular reference to FIG. 1 this replacement bearing includes a tubular housing 1 having spaced circumferential bands 2 and 3 which are knurled for frictional engagement within the eye of a link, in the manner of, and purpose hereinafter explained in detail. Adjacent the knurled band 3, the housing 1 is provided with a protruding neck 5 having external threads. This neck 5 loosely surrounds a portion of the spindle 7 protruding from the housing 1. This spindle has an externally threaded end 9 for the purpose hereinafter explained. Housing 1 has an open end adjacent the knurled band 2 which is closed by a lock cap 10. An aperture 11 centrally located in the lock cap 10 receives the stem 13 of a grease fitting 14 protruding through the aperture.

Turning now to the illustration in FIG. 2 it will be apparent that the stem 13 is sealed within the aperture 11 of lock cap 10 by an O-ring 15 seated in a circumferential groove in aperture 11. The stem 13 has a threaded end 17 in threaded engagement with internal threads in a passage 18 extending axially from one end of the spindle 7. Spindle 7 also has a transverse passage 19 intersecting passage 18 and opening in round external bearing surfaces 20 formed on the spindle 7. Bearing surfaces 20 are generally tapered and of conical shape and vary in diameter from a large end 21 to a small end 22. The actual contour of bearing surfaces 20, although shown tapered, is subject to various modifications so long as the general configuration remains round and varies in diameter from a large end 21 to a small end 22. In order words it is immaterial to the function of these bearing surfaces that they be tapered uniformally from large end 21 to small end 22.

Figure 3:
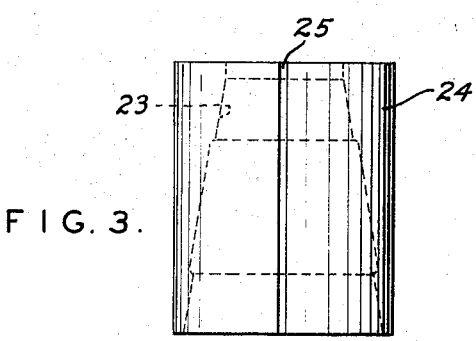
FIG. 3 is a side elevation view of the tapered split bearing member shown in FIG. 2.

Bearing surfaces 20 are in turn journaled in tapered internal bearing surfaces of split bearing member 24, split as indicated in FIG. 2 and 3 at 25 from one end to the other. Preferably bearing member 24 is cylindrical externally and is constructed of a suitable plastic having the required bearing qualities well understood in the art. For example, a cast nylon is eminently suitable.

One end of split bearing member 24 abuts a projecting lip on one radial face of a ring retainer 27. External threads 28 of this ring retainer 27 mate with similar threads internally of the open end of tubular housing 1. These external threads 28 also mate with internal threads 30 on the interior of the skirt of lock cap 10. The bearing comprising the tapered surfaces 20 and the internal tapered surface 23 of split bearing member 24 together form a combined radial and thrust bearing unit.

Supplementing the above described combined radial and thrust bearing unit in its function of journaling the spindle 7 within housing 1 is a separate thrust bearing unit about to be described. On the opposite face of the ring retainer 27 is a conical bearing seat 32. Rotatable on this seat is a cone shaped bearing member 34, also preferably of plastic material. Member 34 is held in position by a pair of nuts 37 and 38 threaded on external threads 40 adjacent the small end 22 of bearing surface 20.

It will be observed that the above described bearing structures are capable of pre-loading by the adjustment of the lock nut means 37 and 38 on threads 40. During this operation a frictional engagement is obtained between the surface of the conical member 34 and the contacting surface thereon at the lower face of nut 37. This frictional connection causes the member 34 to rotate with the nuts 37 and 38 relative to the conical seat 32.

It will be further observed that the threaded engagement of locking cap 10 between threads 30 thereon and threads 28 produce a lock nut effect securing the ring retainer 27 in any desired adjusted position and lock cap 10 on tubular housing 1.

Not only does the construction have these readily observable constructional advantages but others not so readily observable which contribute to dependability and safety. Should it happen that lock nut means 37 and 38 become loosened inadvertently, still the bearing remains operative while the lock nut means 37 and 38 remain trapped within lock cap 10. The spindle 7 is confined axially to movement within the tubular housing 1 and lock cap 10. The disengagement of lock nut means 37 and 38 does not disconnect connecting linkage because spindle 7 and its bearing will remain captive within its housing 1.

In the event that lock cap 10 should accidentally loosen it is still prevented from complete separation from ring retainer 27 by the shoulder 41 on grease fitting 14. Consequently the accidental loosening of cap lock 10 does not disable the bearing unit. These inherent features of construction each contribute to a final bearing product with the advantageous characteristics of reliability and durability. Smooth action of the bearing is obtainable through the precise pre-loading characteristics contributed by the locking means, anti friction bearing member 34 and retainer ring 27 all of which provide for nice adjustment of the combined radial and thrust bearing unit. Subsequent lubrication through grease fitting 14 maintains smooth operation after adjustment.

The illustrations in FIGS. 4 and 5 are primarily for the purpose of explaining installation. The idler arm unit 50 illustrated in FIG. 4 is one example of typical original automotive equipment. This construction will not be described in detail except to point out that each end of the arm 50 has an eye, one of which is indicated in phantom lines. Each eye contains a bearing mounting the spindles 53 and 55 and each bearing is secured in an eye by a cap such as 56 held secured in the eye by a rolled bead 58. To replace either of these bearings for spindles 53 or 55 the rolled bead 58 can be ground away. This releases cap 56 and the bearing mounting, the stem or spindle 53 or 55 can then be forced from within an eye.

The replacement bearing herein described is then inserted into the eye by pressure applied on the end mounting lock cap 10. Knurled band 3 is wedged into one aperture 60 of an eye 61, all as shown in FIG. 5. Knurled band 2 is so dimensioned as to wedge against the internal surface in the eye 61. This will leave the threaded neck 5 exposed to receive a lock nut 63 to permanently secure the replacement bearing in position within the eye 61 while knurled parts 2 and 3 hold the replacement bearing or housing 1 thereof against rotation in the eye. Spindle 7 can then be inserted in the eye of a connecting link of the linkage train and secured by a nut on threads 9.

Changes in, and modification of the construction described may be made without departing from the spirit of my invention or sacrificing any of the advantages thereof.

What I claim and desire to secure by Letters Patent is:

1. A replacement bearing adapted to be press fit in the eye of a member in an articulated linkage, said bearing having a tubular housing dimensioned to be forced into said eye, and a spindle in said tubular housing with an end projecting beyond said tubular housing, the improvement comprising, a combined radial and thrust bearing unit including a sleeve type bearing member seated in said tubular housing, said sleeve having internal cylindrical bearing surfaces of varying diameter in an axial direction with a larger diameter at one end and the smaller diameter at its other end, said spindle having cylindrical external bearing surfaces of varying diameter in an axial direction and being contoured to mate with the internal bearing surfaces on said sleeve type bearing member, an axially movable ring retainer concentric with and threadedly engaging said tubular housing approximate one open end thereof, said ring retainer having a lip overhanging the smaller diameter end of said sleeve type bearing member, means for limiting movement of said ring retainer in a direction away from said tubular housing, and a thrust bearing unit having a part secured on said spindle and a relatively rotatable part supported by the side of said ring retainer opposite from said sleeve type bearing member for holding said sleeve type bearing member positioned in said tubular housing against said ring retainer.

2. The combination as defined in claim 7, and further including said sleeve type bearing member having a singular split from end to end and said thrust bearing unit providing for expansion of said sleeve type bearing member in said tubular housing to eliminate movement therebetween.

3. The combination as defined in claim 1, and further including a cap for enclosing said thrust bearing unit and ring retainer, a threaded connection between said cap and said ring retainer, and said cap providing means for limiting movement of said thrust bearing unit and ring retainer in a direction away from said tubular housing.

4. A replacement bearing adapted to be press fit in the eye of a member in an articulated linkage, said bearing having a tubular housing dimensioned to be forced into said eye, a spindle in said tubular housing with an end projecting beyond said tubular housing, the improvement comprising, a combined radial and thrust bearing unit including a sleeve type bearing member seated in said tubular housing, said sleeve having internal cylindrical bearing surfaces of varying diameter in an axial direction with a larger diameter at one end and the smaller diameter at its other end, said spindle having cylindrical external bearing surfaces of varying diameter in an axial direction and being contoured to mate with the internal bearing surfaces of said sleeve type bearing member, said tubular housing having internal threads approximate one end, a ring retainer concentric with and located adjacent the threaded end of said tubular housing, said ring retainer being externally threaded for engagement with the internal threads of said tubular housing to form means for limiting movement of said ring retainer in a direction away from said tubular housing, a thrust bearing unit having a part secured on said spindle and a relatively rotatable part supported by the side of said ring retainer opposite from said sleeve type bearing member for holding said sleeve type bearing member positioned in said tubular housing against said ring retainer.

5. The combination as defined in claim 4, and further comprising said ring retainer being held against rotation with respect to said tubular housing, said ring retainer having opposite radial faces, one of said faces normally held contiguous with the smaller diameter end of said sleeve type bearing member for acting as an axial support therefor, and the other of said faces being tapered outwardly in a radial direction for forming a bearing surface for one side of the rotatable part of said thrust bearing unit, the other side of the rotatable part of said thrust bearing unit being held axially positioned by the part of said thrust bearing unit secured on said spindle.

6. A replacement bearing adapted to be press fit in the eye of a member in an articulated linkage, said bearing having a tubular housing dimensioned to be forced into said eye, a spindle in said tubular housing with an end projecting beyond said tubular housing, the improvement comprising, a combined radial and thrust bearing unit including a sleeve type bearing member seated in said tubular housing, said sleeve having internal cylindrical bearing surfaces of varying diameter in an axial direction with a larger diameter at one end and the smaller diameter at its other end, said spindle having cylindrical external bearing surfaces of varying diameter in an axial direction and being contoured to mate with the internal bearing surfaces of said sleeve type bearing member, a ring retainer concentric with and located adjacent one open end of said tubular housing, means for limiting movement of said ring retainer in a direction away from said tubular housing, a cap normally disposed in axial relationship contiguous with one end of said tubular housing and providing for closure of the end of said tubular housing, means for retaining said cap contiguous with the end of said tubular housing, a thrust bearing unit having a part secured on said spindle and a relatively rotatable part supported by the side of said ring retainer opposite from said sleeve type bearing member for holding said sleeve type bearing member positioned in said tubular housing against said ring retainer.

7. The combination as defined in claim 6, and further including said ring retainer having external threads, said cap having internal threads for engaging the threads of said ring retainer for holding said cap contiguous to one end of said tubular housing.

8. The combination as defined in claim 6, wherein said cap encloses said thrust bearing unit, said cap having an aperture provided therethrough, a fitting anchored at one end in said spindle and projecting through the aperture in said cap, said fitting having a diameter greater than the diameter of the aperture in said cap.

References Cited by the Examiner
UNITED STATES PATENTS

| | | | |
|---|---|---|---|
| 830,897 | 9/1906 | Harris | 308—17 |
| 1,219,978 | 3/1917 | Masters | 308—71 |
| 2,418,219 | 4/1947 | Bley | 308—70 |
| 2,574,773 | 11/1951 | Bannister | 308—70 X |
| 3,163,451 | 12/1964 | Krizman | 287—93 |

MARTIN P. SCHWADRON, *Primary Examiner.*

DAVID J. WILLIAMOWSKY, *Examiner.*

R. F. HESS, *Assistant Examiner.*